UNITED STATES PATENT OFFICE.

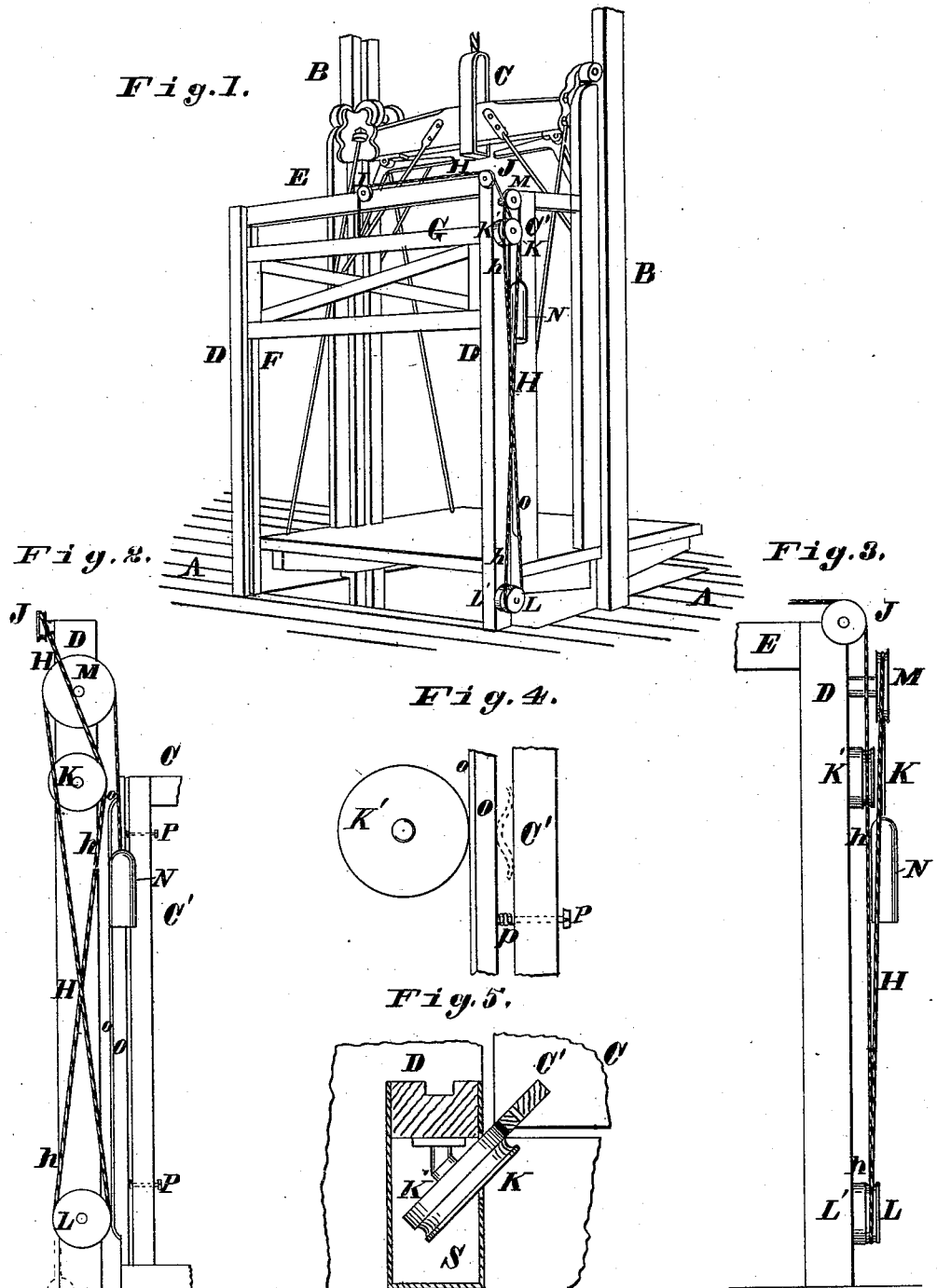

JOHN MARSHALL, OF ST. LOUIS, MISSOURI.

HATCHWAY-GATE MECHANISM.

SPECIFICATION forming part of Letters Patent No. 234,919, dated November 30, 1880.

Application filed September 27, 1880. (No model.)

*To all whom it may concern:*

Be it known that I, JOHN MARSHALL, of the city of St. Louis, in the State of Missouri, have invented a certain new and useful Improvement in Devices for Operating Safety-Gates for Elevators, of which the following is a full, clear, and exact description, reference being had to the accompanying drawings, making part of this specification.

My invention applies more especially to the style of safety-gate which is raised and lowered as a sash.

My invention consists in a cord one end of which is attached to the gate and the other end of which carries a counterbalance-weight, the cord being passed around cord-pulleys attached to friction-pulleys, and in such a manner that a vertical rail on the platform, by its action on the friction pulleys or wheels, will cause the lifting of the gate on the approach of the platform to any floor, and the descent of the gate on its departure from the floor.

In the drawings, Figure 1 is a perspective view. Fig. 2 is an enlarged side view. Fig. 3 is an edge view. Fig. 4 is an enlarged detail side view. Fig. 5 is an enlarged detail horizontal section, showing a modified arrangement.

A is the floor of a building. B B are the ordinary guide-posts of an elevator. C is the platform, which may be of any usual construction. D D are the side posts of the hatch-entrance, and E is the head-timber of the same.

The uprights D have grooves or ways F, in which the ends of the gate G work in its ascent and descent.

H is a cord attached to the middle of the top bar of the gate or to a central upright of the gate. The cord passes from the gate to a pulley, I, overhead, and then to the pulley J. From the pulley J the cord is carried to the pulley K, around which it has one or more turns, so that the rotation of the pulley will communicate positive motion to the cord. From the pulley K the cord is crossed over at *h h* and carried to the pulley L, around which it has one or more turns to insure motion to the cord when the pulley turns. From the pulley L the cord H may pass to a pulley, M, and over such pulley, or it may hang down from the pulley L, and the pulley M be dispensed with, as shown in dotted lines in Fig. 2. In either case the end of the cord is attached to a weight, N, to hold the cord tight upon the pulleys K L, and to more or less counterbalance the gate.

Attached to the cord-pulleys K and L are friction-pulleys K' and L'.

O is an upright piece or rail, whose edge *o* comes in contact with the friction-pulleys to turn them and raise the gate G by the described means.

The edge *o*, in its preferred form, consists of a strip of india-rubber or some other substance that will take good frictional hold of the pulleys, and the faces of the pulleys are fitted to take similar hold of the strip *o*.

The upright rail O is attached to the elevator-platform C in any suitable manner. I have shown it attached by means of bolts P, fixed in the rail and working in a corner-post, C', of the platform, with springs *p* upon the bolts between the rail and the post, so as to keep the rail thrust out against the friction-pulleys, but allow it to retreat in case of too great pressure.

In the modification shown in Fig. 5 the pulleys are chiefly within a hollow trunk, S, beside the side post, D, and the friction-rail is shown as standing diagonally upon the platform.

I do not confine myself to a single cord, H, for it is evident by a duplication of the parts two cords may be used, one attached to each end of the gate.

The operation is as follows: Supposing the platform to be ascending to the floor A, when the upper end of the friction-rail O reaches the friction-wheel L' it will turn the pulleys so as to lower the counterbalance-weight N and draw up the gate. As the cord is crossed between the pulleys K and L it will be seen that the pulley K will be driven in an opposite direction to that of L. When the floor of the platform has reached a point level with the floor A the gate has reached a sufficient elevation to allow free access to the platform. The continued ascent of the platform brings the friction-rail in contact with the friction-wheel K', and the pulley K will have rotation in an opposite direction to that received from pulley L described, and the gate will descend. If, on the contrary, the platform descends from any floor, it is obvious that the descending friction-rail will give to the pulleys a direction of rotation opposite to that imparted by the rail when ascending. As the platform is approaching a floor from above the friction-rail first comes in contact with the friction-wheel K', and the gate will be raised by the time the floor of the platform is even with the floor A of the building.

I claim as my invention—

The combination of sliding gate G, cord H, counter-balance N, pulleys K and L, connected by the cord crossed between them, friction-wheels K' L', and the friction-rail O, attached to the platform.

JOHN MARSHALL.

Witnesses:
SAML. KNIGHT,
C. W. H. BROWN.